J. F. Keller.
Fertilizing Mach.
No. 3,461. Reissued May 25, 1869.
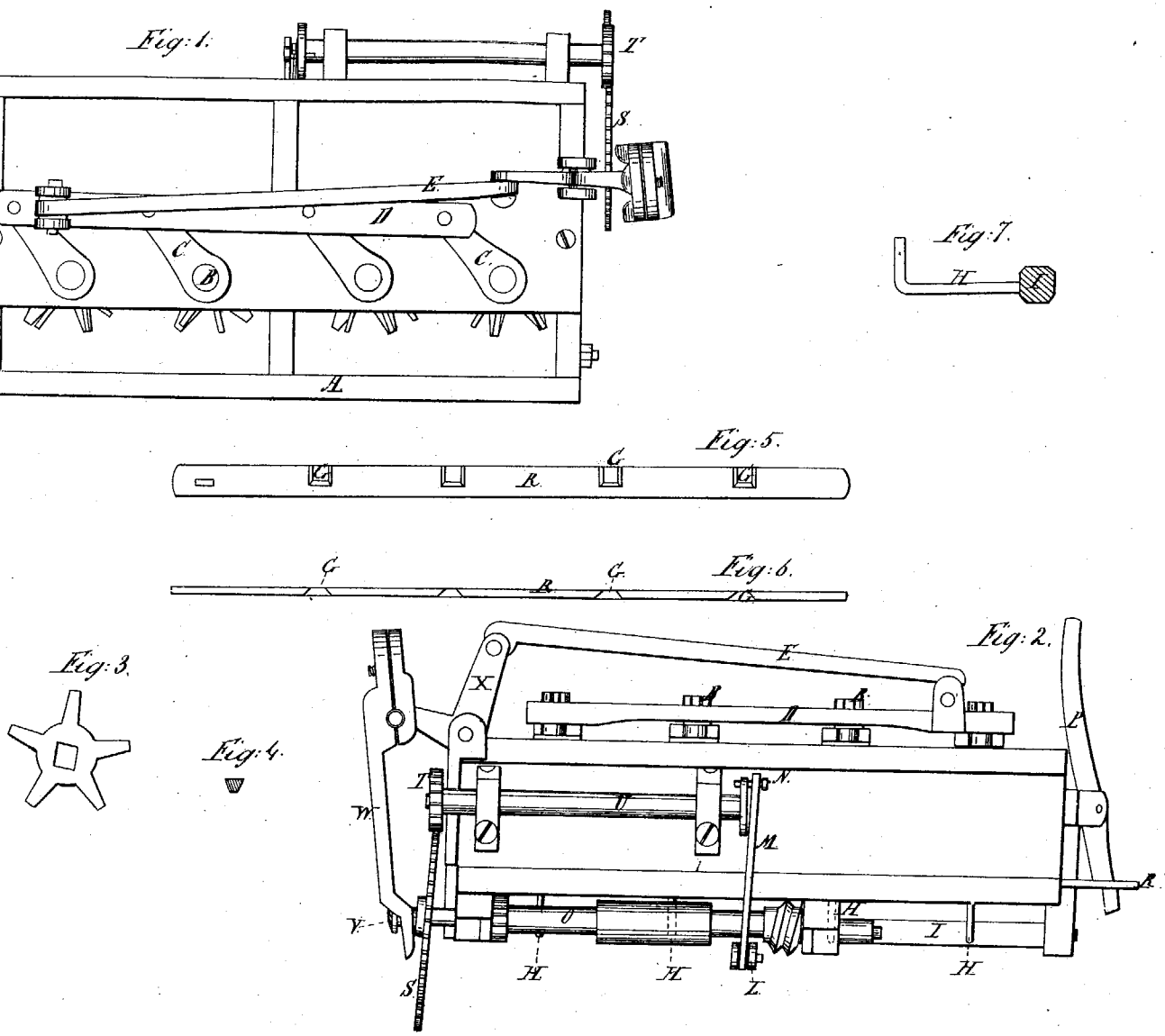
Witnesses.
H. M. Gilbert
L. J. Bowen.
Inventor.
John F. Keller
by his Attorney Daniel Breed
N. PETERS, PHOTO-LITHOGRAPHER, WASHINGTON, D. C.

UNITED STATES PATENT OFFICE.

JOHN F. KELLER, OF HAGERSTOWN, MARYLAND, ASSIGNOR TO ABRAHAM MILLER, WM. H. PROTZMAN, ALPHEUS R. APPLEMAN, AND WM. UPDEGRAFF, OF SAME PLACE.

IMPROVEMENT IN MACHINES FOR SOWING FERTILIZERS.

Specification forming part of Letters Patent No. 31,084, dated January 8, 1861; Reissue No. 1,718, dated July 5, 1864; Reissue No. 3,461, dated May 25, 1869.

*To all whom it may concern:*

Be it known that I, JOHN F. KELLER, formerly of Greencastle, in the county of Franklin and State of Pennsylvania, but now of Hagerstown, in the county of Washington and State of Maryland, have invented a new and useful Improvement in Fertilizer Attachments to Seed-Planters; and I do hereby declare that the following is a full and exact description thereof, reference being had to the accompanying drawings, and to the letters of reference marked thereon.

In the construction and use of machines for sowing fertilizers, especially guano, it is difficult to prevent the fertilizers from bridging in the hopper, and thus clogging the machine. Such bridging may occur above the stirrers or at the feed-holes; or the fertilizer may adhere to the stirrers themselves, as is not unfrequently the case with spiked shafts or rollers revolved constantly in one direction. These difficulties are generally increased when the fertilizer to be sowed is wet or moist, as is often the case with guano, and it is important to have some means of breaking or crushing the hard lumps or bones occurring in most kinds of guano. The greasy adhesive nature of guano requires a jarring as well as a stirring action in the hopper or stirrers, in order to render the feeding regular and complete. If the stirrers are moved constantly in one direction, the guano will often adhere to them, and then a mass of guano moves with the stirrers, and thus they are clogged and the feeding stopped; but by a reciprocating action the stirrer, when moving in one direction, pushes the guano before it, packing the mass together, and then by the reverse stroke the stirrer breaks away from such mass, thus freeing the stirrer from adhesion of guano and shaking down the mass as fast as the feeding makes room below.

My invention consists of a peculiar improved arrangement and construction of stirrers, clearers, and gearing, and their mode of operation, for the purpose of sowing fertilizers and preventing the same from clogging the machine.

In the accompanying drawings, Figure 1 is a top view of my machine. Fig. 2 is an elevation of the same. Figs. 3, 4, 5, 6, and 7 represent detached parts of the machine.

In the drawings, A represents the box or hopper into which the guano is put for sowing. In this hopper is arranged a series of spike-rollers, B, for stirring the guano and breaking the lumps or bones in the same. These rollers move only through a partial revolution, being turned forward and backward by means of cranks C, which are all united by bar D, and receive reciprocating motion through the connecting-rod E, thus adjusting the guano in the hopper. At every change of motion of these cranks and rollers a jarring action is produced, the rollers B, their spikes, and the hopper itself being more or less shaken by reversing the stroke of the cranks. Thus the adhesive guano is jarred off from the rollers and spikes, and also from the feed-holes in the bottom of the hopper, rendering the feeding complete, and preventing the possibility of clogging or bridging in the hopper. The stirrers also break away from the mass they have pushed forward, thus preventing the usual difficulties of packing before the stirrers, and consequent clogging. The guano passes through between the star-shaped device at the bottom of the rollers B, in order to reach the discharge-openings. The lower end of each spike-roller has a socket, Fig. 3, cast with the spikes, which are beveled at their sides, as seen in Fig. 4, (which is a vertical section of one of these lower spikes.) These beveled spikes ride upon the bottom of the hopper and sweep across the discharge-openings, and thus keeping free adhesions of guano.

The slide R, Figs. 5 and 6, forms part of the bottom of the hopper, and contains the discharge-openings G. The openings are made in a peculiar manner. The lower side of the slide is cut away, so as to leave a sharp edge on the upper side of the slide, as seen in Fig. 6, (which is a view of one edge of the slide.) This sharp edge prevents the holes from clogging. In order to insure the regular feed and guard further against clogging, I have arranged under the hopper a series of clearers, H, which play up and down in holes G. These clearers are operated by means of a rock-shaft, I, which receives motion from lever L, connecting-rod M, and crank N, as seen in Fig. 2. A detached view of clearer H is seen in Fig. 7.

My machine is attached to a wheat-drill or seed-planter, and the traveling wheel connected with shaft O, thus giving motion to my machine. The shaft O carries a cog-wheel, S, which operates the pinion T, crank-shaft U, and crank V, giving motion to connecting-rod W. The elbow X is connected with rod W by means of a free-working collar provided with pivots at each side. so as to produce a universal joint of peculiar construction. By these means motion is communicated to the rod E, bar D, and rollers B. The rod E is made detachable from elbow X, in order to stop the motion of the rollers at pleasure, (the driver simply lifting the rod E from the elbow.) By means of the lever P the slide R may be moved so as to partially or entirely close the feed-openings, thus regulating or stopping the sowing of the fertilizer.

I am aware that spike rollers or stirrers are not new, and that most of the devices employed in my machine have been previously used; but I believe that the peculiar construction, arrangement, and operation above described are new and a great improvement upon any machine heretofore known. I limit my claims to the peculiar improvements above described.

Having thus fully described my invention, what I claim, and desire to secure by Letters Patent of the United States, is—

1. The arrangement of a series of spiked rollers, B, when placed vertically and moved through a partial revolution by a reciprocating motion, substantially as set forth, whereby the fertilizer are both delivered and prevented from clogging.

2. The combination of the clearers H and feed-slide R, Figs. 5 and 6, the latter having the peculiar openings G, with sharp edges for cutting the fertilizer away, substantially in the manner and for the purposes described.

3. The combination and arrangement of the rollers B, cranks C, and bar D, as and for the purpose specified.

JOHN F. KELLER.

Witnesses:
J. FRANKLIN REIGART,
EDM. F. BROWN.